United States Patent [19]

Blanchard

[11] Patent Number: 5,594,561
[45] Date of Patent: Jan. 14, 1997

[54] FLAT PANEL DISPLAY WITH ELLIPTICAL DIFFUSER AND FIBER OPTIC PLATE

[75] Inventor: Randall D. Blanchard, Vista, Calif.

[73] Assignee: Palomar Technologies Corporation, Carlsbad, Calif.

[21] Appl. No.: 40,648

[22] Filed: Mar. 31, 1993

[51] Int. Cl.⁶ .......................... G02F 1/1335; G02B 5/02; G03B 21/00
[52] U.S. Cl. .............. 349/59; 385/901; 353/74; 349/62; 349/96; 349/112; 349/137; 349/159
[58] Field of Search .................. 359/40, 63, 41, 359/42, 48, 49, 50, 69, 452, 453, 456, 599, 493; 353/74, 97, 122; 385/116, 120, 901

[56] References Cited

U.S. PATENT DOCUMENTS

| | | | |
|---|---|---|---|
| 2,287,556 | 6/1942 | Land | 359/452 |
| 4,088,400 | 5/1978 | Assouline et al. | 359/63 |
| 4,349,817 | 9/1982 | Hoffman et al. | 359/42 |
| 4,660,936 | 4/1987 | Nosker | 359/63 |
| 4,762,393 | 8/1988 | Gerritsen et al. | 359/72 |
| 4,799,050 | 1/1989 | Prince et al. | 359/50 |
| 4,807,975 | 2/1989 | Negishi | 359/40 |
| 4,807,978 | 2/1989 | Grinberg et al. | 359/619 |
| 4,868,383 | 9/1989 | Kurtz et al. | 250/228 |
| 4,904,049 | 2/1990 | Hegg | 385/116 |
| 4,917,465 | 4/1990 | Conner et al. | 359/41 |
| 5,035,490 | 7/1991 | Hubby, Jr. | 359/42 |
| 5,042,921 | 8/1991 | Sato et al. | 359/40 |
| 5,128,783 | 7/1992 | Alibeath et al. | 359/40 |
| 5,200,843 | 4/1993 | Karasawa et al. | 359/40 |
| 5,303,083 | 4/1994 | Blanchard et al. | 359/495 |
| 5,347,433 | 9/1994 | Sedlmayr | 362/32 |

FOREIGN PATENT DOCUMENTS

| | | | |
|---|---|---|---|
| 53-130055 | 11/1978 | Japan | 359/42 |
| 0345924 | 2/1991 | Japan | 359/62 |
| 0242603 | 10/1991 | Japan | 359/62 |
| 0493922 | 3/1992 | Japan | 359/62 |

OTHER PUBLICATIONS

Biles, Jack; "Collimated Fluorescent Backlights For LCD Direct Viewing;" SPIE vol. 1911; Feb. 1993; pp. 169–174.
Doane, J. W.; "Polymer–Dispersed Liquid–Crystal Devices;" Proceedings of the SID; vol. 32/2, 1991; pp. 133–135.
Bigelow et al "A Multiplexed 64–Character Liquid Crystal Display with Improved Optics" SID 77 Digest—Apr. 1977—pp. 62–63.

*Primary Examiner*—William L. Sikes
*Assistant Examiner*—Tai V. Duong
*Attorney, Agent, or Firm*—Rodney F. Brown

[57] ABSTRACT

A flat panel liquid crystal display module (34) has its front face adjacent a rear projection screen (40) and is illuminated by a pre-polarized collimated light source (10,14,16,18,22, 26). Collimation is provided by either a Fresnel lens or a projection lens having a long focal length. The characteristics of the projection screen (40) provide narrowed vertical viewing angle and a fiber optic face plate (38) between the liquid crystal module (34) and the screen (40) provides sunlight rejection. The arrangement has greatly improved display brightness, with only minimal changes in contrast and color as viewing angle changes.

14 Claims, 2 Drawing Sheets

FLAT PANEL DISPLAY WITH ELLIPTICAL DIFFUSER AND FIBER OPTIC PLATE

BACKGROUND OF THE INVENTION

1. Field of the Invention

The present invention relates to flat panel display systems, and more particularly concerns such a system employing a rear projection screen and having greatly improved brightness.

2. Description of Related Art

Flat panel display systems are commonly employed in so-called lap-top, notebook or other portable computers in which packaging dimensions are of critical significance. In particular, a major effort in the design and construction of such flat panel display systems is an attempt to keep the thickness of the display system to a minimum. Minimum display thickness or depth is obtained by employing a flat minimum depth illumination source. The illumination source often comprises a flat fluorescent light system and a contiguous diffuser that are positioned closely adjacent the rear surface of an active matrix liquid crystal module with a transparent screen or other protective layer covering the front face of the liquid crystal module. The diffuser is provided in an attempt to distribute light from the fluorescent source evenly over the liquid crystal module. In viewing the displayed image the viewer effectively looks through the liquid crystal module at the diffused light source behind it. This light generally has a Lambertian distribution, e.g. a uniform distribution in which intensity decreases with the cosine of the viewing angle away from an on-axis direction, a perpendicular to the screen.

A normal vertical viewing angle of an observer is plus or minus 15°, although horizontal viewing angles are generally larger. The diffused light passing through the liquid crystal panel and transmitted at a vertical angle outside of the plus or minus 15° vertical viewing angle is effectively wasted. Utilizing fluorescent illumination and even with a diffuse light source behind the liquid crystal panel, it is difficult to provide a uniformity of brightness or light intensity over a large surface area of the display. Further, because the viewer is effectively looking through the liquid crystal display panel at the diffuse light source behind it, that portion of the light path from the viewer's eye through the liquid crystal material itself changes in length as viewing angle changes. That is, more of the liquid crystal material will act on a light ray passing through the liquid crystal panel at an angle than on a light ray passing through the liquid crystal panel at a normal to its surface. This results in degradation of image contrast because the greater the light path length through the liquid crystal material, the greater the effect of the liquid crystal material. Color is also degraded by use of a diffuse light source behind the liquid crystal module.

Because of the panel thickness limitation, high intensity light sources are not used, and overall screen brightness is relatively low. Such systems have very poor visibility in high ambient light and are nearly impossible to utilize in direct sunlight. Further, the dynamic range of available light intensity is limited so that a system arranged for operation in relatively high intensity ambient light cannot be operated with sufficiently low brightness level for night operation.

Accordingly, it is an object of the present invention to provide a flat panel liquid crystal display system that avoids or minimizes above mentioned problems.

SUMMARY OF THE INVENTION

In carrying out principles of the present invention in accordance with a preferred embodiment thereof a flat panel liquid crystal display system comprises a liquid crystal display module having front and rear faces and collimated light source means for transmitting substantially collimated light to the rear face. A rear projection screen, which is preferably a diffusing screen, is positioned adjacent the front face for receiving the collimated light transmitted through the liquid crystal display panel. By using a collimated light source behind the liquid crystal panel and a rear projection screen in front of the liquid crystal panel, all of the light from the source passes through the liquid crystal panel at a near normal angle. Little or none of the light passes through the liquid crystal material at high angles. Therefore, the viewing angle is controlled primarily by the rear projection screen in front of the liquid crystal panel because the image is formed substantially at the rear face of the projection screen and is diffused from the screen.

BRIEF DESCRIPTION OF THE DRAWINGS

In the accompanying drawings:

FIG. 2 shows a modification of the system of FIG. 1 having a simplified light source.

DESCRIPTION OF THE PREFERRED EMBODIMENTS

Figure 1:
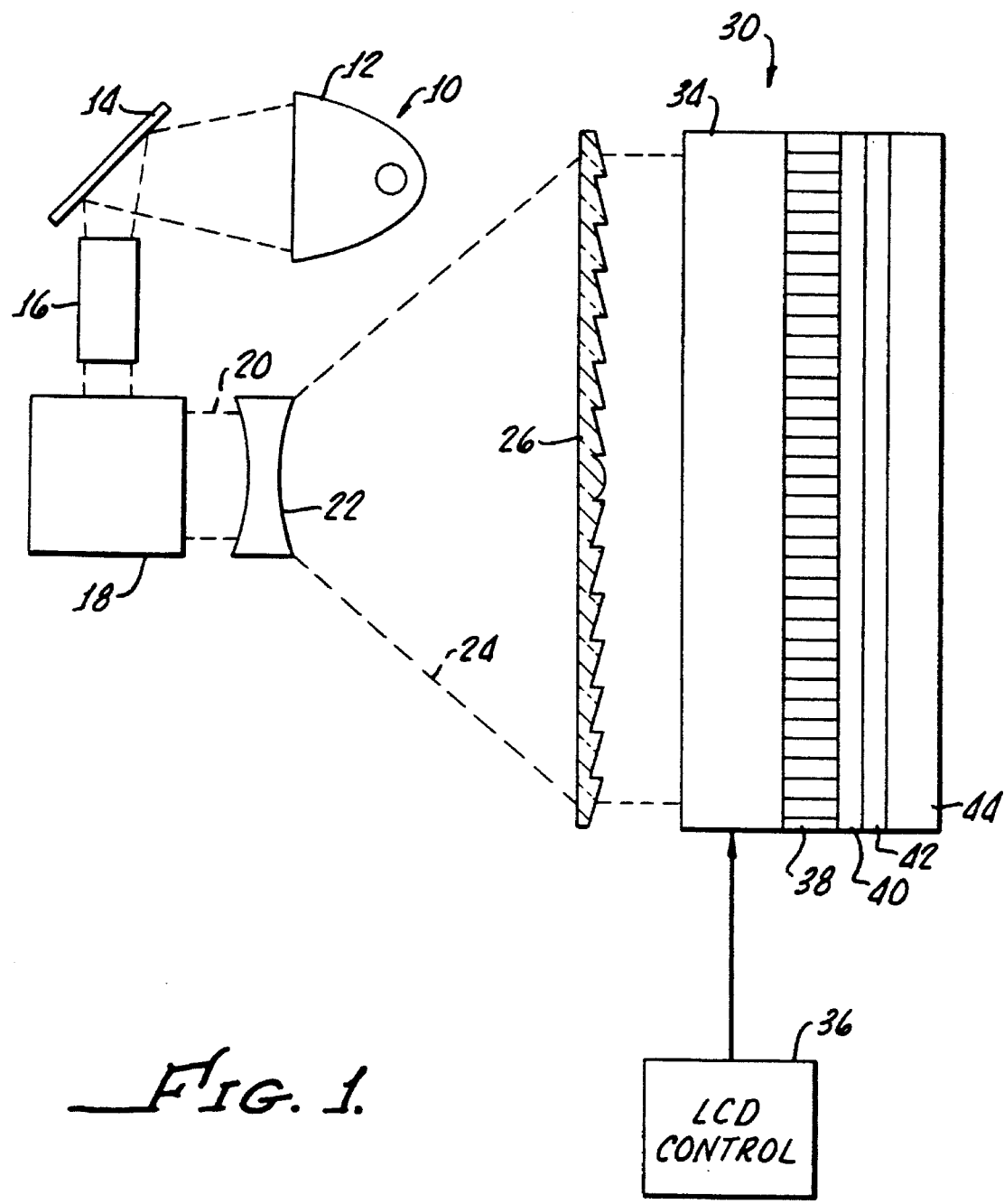

Referring to the single drawing figure, high intensity light source 10, which may be a metal halide lamp or a Xenon arc lamp, includes an elliptical reflector 12 that directs light to a cold mirror and heat filter 14. If deemed necessary or desirable, a hot mirror (not shown) transparent to the visible light, may be added to the system and located in front of the light source. Heat generated by the high intensity lamp is dissipated to a significant extent at the cold mirror, which may be provided with a suitable heat dissipating arrangement (not shown). Mirror 14 may be a cold mirror or a hot mirror, or may include color balance filter layers or some combination so as to provide a balanced white light.) The light beam is bent at a substantially 90° angle and reflected from the cold mirror to pass through a light integrating tube 16 which may take the form of a square cross section glass body that transmits light with total internal reflection. Integrator 16, alternatively, may be formed by a hollow square tube having internal mirrored surfaces. In an exemplary system such a tube may be approximately ¼ inch square and have a length of 1½ inches.

The purpose of the tube is to integrate the light from the arc lamp 10 and to provide the light beam with a substantially uniform intensity over its entire area. Thus, the uniform intensity of the resulting light beam is independent of the varying spatial intensity distribution of light actually generated by the arc lamp itself.

A light beam of uniform intensity from integrator 16 is fed to a polarization prism 18, which polarizes the light from the beam to provide an output beam 20 directed at right angles to the path of the light beam from the integrator and having only a single polarization state. The liquid crystal module requires illumination with light having only one polarization state. A polarization prism normally will pass light of one polarization state and reflect light of a second polarization state. Effectively, then, a normal polarization prism will separate the light into two paths and enable use of the light only in the one path which has the desired polarization state. To enhance the efficiency of light utilization the polarization prism 18 preferably employs a polarization recovery prism arrangement such as is shown and described in a co-pending application for Polarized Light Recovery, Ser. No. 935,622, filed Aug. 26, 1992, of Randall D. Blanchard, Eugene W. Cross, Jr. and Ronald D. Shirley, now U.S. Pat. No. 5,303,083. The details of this application are incorporated herein by this reference as though fully set forth. In the polarization recovery prism the light beam is split into two beams, the first having one polarization state and the second having a second polarization state. The light in the second beam then has its polarization state changed and this second light beam, now having the same polarization state as the polarization of the first light beam, is combined with the first light beam to provide an output beam having a single uniform polarization and the intensity of substantially all of the incoming light.

Polarized light from the polarization prism 18 is fed to a beam expanding lens 22 which expands the beam as indicated by dotted lines 24 to cover substantially the entire area of a flat collimating Fresnel lens 26 that has a size and shape substantially the same as the size and shape of the effective area of an adjacent liquid crystal module 34.

The Fresnel lens 26 is mounted closely adjacent to and substantially in contact with the rear face of a multilayer liquid crystal display assembly, generally indicated at 30. The liquid crystal display assembly is formed of a plurality of layers in face to face contact. A first layer 34 comprises a flat panel active matrix liquid crystal module 34, being a thin flat module, that is driven by control electronics, generally indicated at LCD control 36. The control electronics provides for activation of individual pixels of the liquid crystal array, which may have 640×480 pixels in a standard 10.4" diagonal measurement liquid crystal module. The liquid crystal module includes a linear polarizing input layer (not shown) lined up with and receiving polarized and collimated light, and an output linear polarizing layer (not shown) at its front face that effectively detects light leaving the polarization of the light passed by the activated pixels of the liquid crystal module. The normal operation of the active matrix liquid crystal module is to change the polarization state of transmitted light at those pixels of the liquid crystal module that are turned "off" but to leave polarization unchanged for light transmitted through those pixels that are not turned off. The light of unchanged polarization from the "on" pixel is blocked by a linear polarization layer (not shown) at the front face of the liquid crystal module. At the front face of the liquid crystal module 34 is a layer of black clad fiber optics forming a thin face plate 38. Further details of this fiber optic face plate are shown in a co-pending application for Rear Projection Screen With High Off-Axis Sunlight Rejection, Ser. No. 08/1040,417 filed Mar. 31, 1993, now abandoned (attorney's docket 89-274-D, PD-92690). The details of this application are incorporated herein by this reference as though fully set forth. As more particularly described in this co-pending application, the fiber optic face plate 38 effectively provides for rejection of sunlight striking the display at an angle greater than a relatively narrow off-axis angle, Basically, the fiber optic face plate is made of opaquely clad optical fibers having a relatively low numerical aperture (e.g. in the order of 0.24 to 0.35) so as to accept incoming light only in a relatively small cone angle. This small numerical aperture causes the face plate to accept and transmit collimated light (from lens 26) with high efficiency, but to reject ambient light received at higher angles.

The next layer of the liquid crystal display assembly is a rear projection screen or diffuser 40 which provides a rear projection screen having a controlled pattern of diffusion. Features of this rear projection screen and its diffusion characteristics are set forth in detail in a related application for Elliptical Diffuser, Ser. No. 08/1071,126, filed Jun. 2, 1993, now abandoned filed (attorney's docket 89-272-D, PD-92614). The details of this application are incorporated herein by this reference as though fully set forth.

Briefly, the rear projection screen 40 is formed of a plastic matrix in which are embedded a number of diffusing particles, such as microspheres, that initially have a uniform isotropic density distribution. The material is stretched in a single direction, such as a vertical direction, to greatly decrease the density of the diffusing particles in the vertical direction while leaving the density of particles in the horizontal direction substantially unchanged. With this asymmetry of diffusing particle distribution the diffuser 40 acts to receive the collimated incoming light from the liquid crystal module 34 and fiber optic face plate 38 and provide an elliptical output pattern. That is, screen gain for this diffuser is greatly increased for a narrow vertical viewing angle because much of the light that would otherwise have been transmitted at large vertical angles is concentrated in the narrow vertical viewing angle. Screen gain in horizontal viewing angles (over the narrow vertical viewing angle) is also increased.

Positioned adjacent the outside of the diffusing rear projection screen 40 is a layer of polarizing material 42 that helps to prevent bright ambient light that enters the system at the front from being reflected back to the viewer.

A final exterior anti-reflection coating 44 is applied to the outer face of the polarizing sheet 42. The anti-reflection layer 44 in a preferred embodiment may take the form of a glass sheet with a suitable anti-reflection coating.

In operation, the high intensity light source 10 provides unpolarized light that is reflected from the cold mirror 14 and through the light integrator tube 16 to be polarized by the polarizing prism 18 and expanded in the lens 22 to the flat Fresnel collimating lens 26. Accordingly, collimated light of a single polarization state and of a high uniformly distributed intensity is transmitted from the Fresnel lens to the rear face of the liquid crystal module 34. Activation of the individual pixels of the liquid crystal, under control of information provided by electrical signals from LCD control 36, causes light to be transmitted through the liquid crystal display panel with polarization states distributed over the various pixels of the LCD panel and having a spatial distribution of light of a selected polarization according to the spatial distribution of those of the LCD pixels that are activated. The collimated light is transmitted through the liquid crystal module, through the fiber optic face plate, which has a low numerical aperture (e.g. a small acceptance cone angle), and then to the elliptical diffuser that forms the rear projection screen 40. The image is radiated in a controlled diffusion pattern from the screen 40.

The image is formed substantially at the front face of the liquid crystal module, at the interface between the fiber optic face plate and the liquid crystal module, and thus even when viewed at an angle, the light forming the image has been transmitted through the liquid crystal material in a direction substantially normally to the liquid crystal display module surface. Therefore, contrast of the image does not significantly vary with viewing angle, and color remains substantially the same with variation in viewing angle. Light passing through the rear projection diffusing screen 40 then passes through, with minimum loss, the polarization sheet 42 that transmits light of only a single polarization to and through the anti-reflection coated glass front plate 44.

In a preferred embodiment the liquid crystal module has a thickness of about 0.2 inches, the fiber optic face plate a thickness of 0.125 inches, the rear projection diffuser screen a thickness of about 0.040 inches, the polarizing sheet a thickness of about 0.010 inches, and the glass plate a thickness of about 0.125 inches. For a total display that is 5"×5" the total thickness of the system, including the light source and optics, is approximately 8 inches.

Although this thickness is greater than the thickness of the common flat panel display, the system disclosed herein has a number of significant advantages. The disclosed system can be utilized in high ambient light, and, in fact, can be utilized in sunlight, at least in part because of the fiber optic face plate that actually prevents sunlight from passing through the display panel to the liquid crystal module 34 from which it might otherwise be reflected. Reflection of sunlight from internal surfaces, such as the liquid crystal panel, which would occur in the absence of the fiber optic face plate, seriously degrades the quality of the image in such high ambient light intensity applications. Brightness of illumination is further enhanced by the ability of the system to employ a higher intensity lamp, such as a metal halide lamp or Xenon arc lamp. No diffuser is employed behind the liquid crystal panel, but, on the contrary, light transmitted to the liquid crystal is collimated light, and thus forms an image at the front face of the liquid crystal. This image is readily diffused through a controlled diffusion pattern by the rear projection screen 40. The described asymmetry of diffusing particle distribution along horizontal and vertical axes provided in the diffuser 40 provides greatly increased screen gain that enables utilization of light that would otherwise have been transmitted through high vertical viewing angles and therefore lost. Intensity of the lamp source, which effectively is a point source, may be readily controlled to provide adequate dimming for night operation, while at the same time high intensity if the lamp enables use of the display in sunlight. The described system may be utilized for retrofit of various types of avionics instrumentation to provide small sunlight readable color displays and may be used in any flat panel application requiring improved sunlight readability.

In place of the polarizer element in the screen, a color filter can be effectively used for sunlight rejection and therefore contrast enhancement. The color filter has a higher average attenuation of broad spectrum "white" light than the three primary colors (red, green and blue) of the displayed image, that is the spectrum between blue and green and between green and red is highly attenuated.

Although a Fresnel lens has been described for providing a substantially collimated light, it will be readily understood that substantially collimated light can be provided by other means such as a projection or expanding lens 22 having a relatively long focal length. Use of such a long focal length projection lens, of course, would increase the size of the system along the length of the projection path between the lens and the liquid crystal module.

Figure 2:
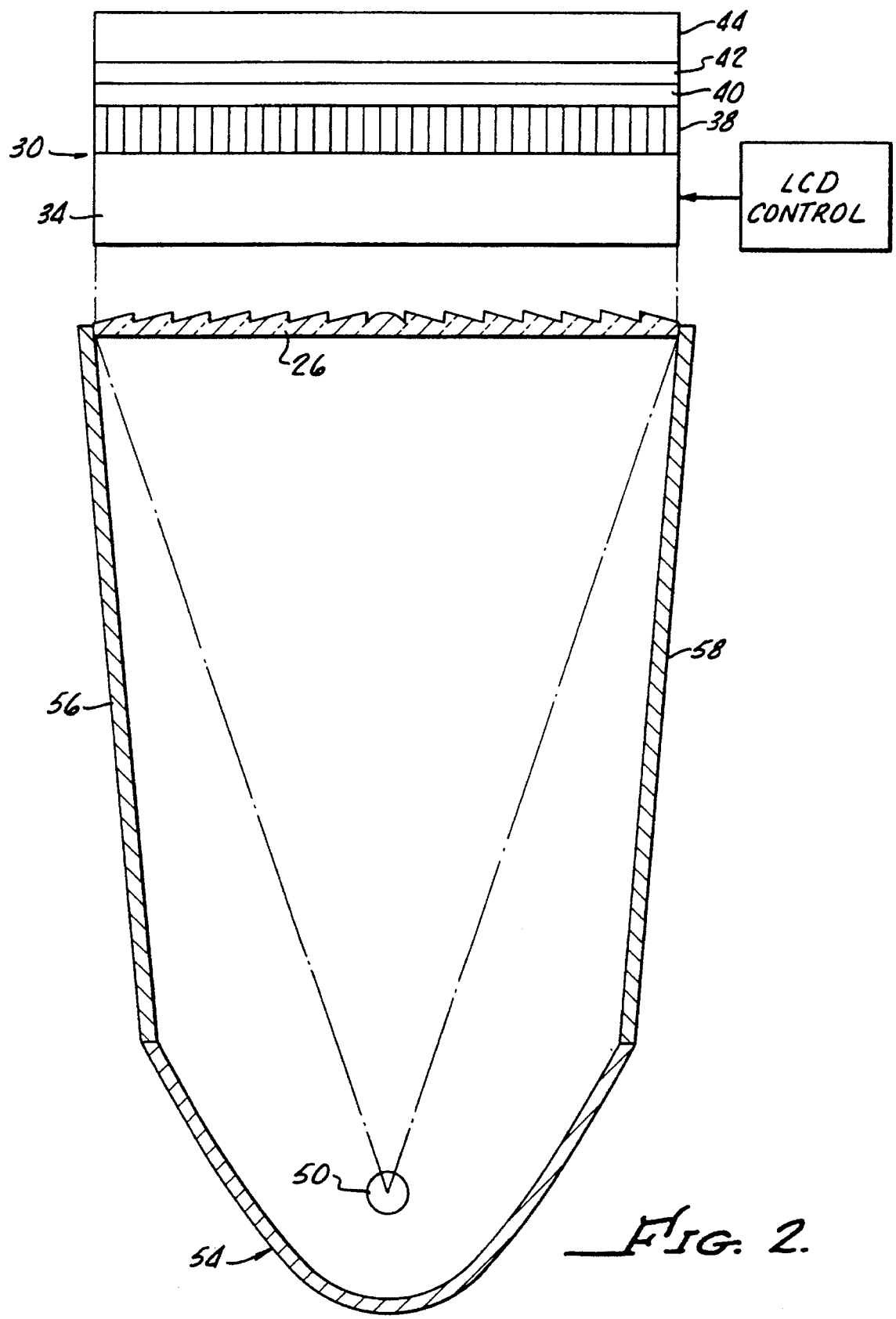
FIG 2. illustrates an arrangement of components of a flat panel contact projection display system employing principles of the present invention.

Illustrated in FIG. 2 is a modification of the projection system in FIG. 1, modified to provide a simplified light source. The liquid crystal display assembly 30 of the arrangement of FIG. 2 is substantially identical to that of FIG. 1. However, in the arrangement of FIG. 2 the light source comprises a source 50 which may be a metal halide lamp or a Xenon arc lamp and having a hybrid parabolic/elliptical reflector 54 that direct light from the arc lamp 50 in a direction substantially perpendicular to the surface of the panel display 30. If deemed necessary or desirable, light projected from the lamp 50 and reflector 54 may be confined by a somewhat conical box having sides such as those indicated at 56 and 58 which may be of polished metal or bright white to help corner edge brightness. The light box including side panels 56 and 58 (which also has an upper and lower sides) terminates in the Fresnel lens 26 which may be the same as the Fresnel lens described above in connection with FIG. 1. The relation of the lens 26 to the liquid crystal display 30 is the same as that previously described. Uniformity of brightness of light from the source is improved by adjusting the curvature of the hybrid reflector according to known available software programs.

In an arrangement such as that illustrated in FIG. 2, Fresnel lens may have a six inch focal length and have a 5.7 inch diagonal measurement. The length of the light source between the arc lamp 50 and the Fresnel lens is approximately six inches and the lamp 50 may be mounted in conventional fashion through a suitable hole (not shown) in the reflector 54. In the modification of FIG. 2 no prepolarizer is needed, and light input to the liquid crystal module is polarized by the input polarizing layer at the rear face of the module. Although the invention has been described and illustrated in connection with liquid crystal modules of the types of presently known and widely employed in display devices, it will be readily understood that other types of liquid display modules may be employed. For example, polymer-dispersed liquid crystals are a relatively new class of materials having use in many types of displays and other light shutter devices. Polymer-dispersed liquid crystal devices are described in an article entitled "Polymer-Dispersed Liquid Crystal Devices" by J. W. Doane, Liquid Crystal Institute at Kent State University in the proceedings of SID Vol. 32/2 (1991) pages 133–135. Such materials are presently useful for projection displays such as projection, television and full color projection, and may be employed in the practice of the invention described herein.

There has been described a display system configuration employing several novel elements in a combination that results in a high efficiency, small sunlight readable color display.

What is claimed is:

1. A flat panel display system comprising:
    a light modulating display module having front and rear faces,
    collimated light source means for transmitting substantially collimated light to said rear face, and
    a rear projection screen adjacent said front face, which comprises:
        contrast enhancement means for attenuating ambient light,
        a diffuser interposed between said contrast enhancement means and said display module, and
        a fiber optic layer interposed between said diffuser and said display module, said fiber optic layer being formed of optical fibers having a low numerical aperture,
        wherein said diffuser includes diffusion particles having a first density in a first direction and a second density in a second direction that is greater than said first density.

2. The flat panel display system of claim 1 wherein said diffuser particles have an asymmetric diffusing particle distribution for receiving collimated incoming light from said light modulating display module and fiber optic layer and for providing an elliptical diffusion output pattern.

3. The flat panel display system of claim 1 wherein said diffuser particles have an asymmetric diffusing particle distribution for receiving collimated incoming light from said light modulating display module and fiber optic layer and for providing a high screen gain in a relatively small vertical viewing angle.

4. The flat panel display system of claim 1 wherein said contrast enhancement means comprises a polarizer.

5. The flat panel display system of claim 1, wherein said contrast enhancement means comprises a color filter.

6. A flat panel display system comprising:

a light modulating display module having front and rear faces, collimated light source means for transmitting substantially collimated light to said rear face, wherein said collimated light source means includes a point light source having an arc lamp, a polarizer for receiving light from said arc lamp, an expanding lens for transmitting light from said polarizer, a light integrator positioned between said arc lamp and said polarizer, and a collimating lens interposed between said expanding lens and said display module and adjacent said display module rear face, wherein said collimating lens collimates light received from said expanding lens, a rear projection screen optically coupled to said front face of said display module, a fiber optic face plate positioned adjacent said front face of said display module, and contrast enhancement means positioned adjacent said fiber optic layer for attenuating ambient light.

7. The flat panel display system of claim 6 wherein said rear projection screen comprises a diffuser.

8. The flat panel display system of claim 6 wherein said collimating lens comprises a flat Fresnel lens.

9. The flat panel display system of claim 6 wherein said polarizer comprises polarization recovery means interposed between said integrator and said collimating lens for polarizing light from said point light source to provide a light beam having a single polarization state with substantially all of the light from said point light source.

10. The flat panel liquid crystal display system of claim 6 wherein said light integrator comprises a column of light transmitting material.

11. The flat panel display of claim 6 wherein said fiber optic layer is formed of optical fibers having a low numerical aperture.

12. The flat panel display of claim 7 wherein said diffuser includes diffusion particles having a first density in a first direction and a second density in a second direction that is greater than said first density.

13. A method of providing a liquid crystal display comprising the steps of:

positioning a fiber optic face plate between a diffuser and a front face of a liquid crystal module, generating a polarized substantially collimated light beam by passing light from an arc lamp through a light integrator, a polarizer, an expanding lens, and a collimating lens.

transmitting said polarized substantially collimated light beam through the liquid crystal module, the fiber optic face plate, and the diffuser, wherein the fiber optic face plate has a low numerical aperture, transmitting information to be displayed to said liquid crystal module, radiating light from said diffuser in an elliptical pattern having a decreased vertical viewing angle, and enhancing the contrast of said light beam exiting the fiber optic face plate by attenuating ambient light.

14. A method of displaying an image comprising the steps of:

generating a polarized substantially collimated light beam by passing light from an arc lamp through a light integrator, a polarizer, an expanding lens, and a collimating lens, transmitting said polarized substantially collimated light beam through a liquid crystal module and a fiber optic face plate having a low numerical aperture, diffusing light at said fiber optic face plate in an elliptical pattern, enhancing the contrast of the diffused light by attenuating ambient light, and driving said liquid crystal module with signals that collectively define an image to be displayed.

* * * * *

UNITED STATES PATENT AND TRADEMARK OFFICE
CERTIFICATE OF CORRECTION

PATENT NO. : 5,594,561

DATED : January 14, 1997

INVENTOR(S) : Randall D. Blanchard

It is certified that error appears in the above-identified patent and that said Letters Patent is hereby corrected as shown below:

Column 2, line 21: delete "FIG. 2" and insert -- FIG. 1 --.

Column 3, line 50: delete "08/1040,417" and insert -- 08/040,417--.

Column 4, line 3: delete "08/1071,126" and insert -- 08/071,126 --.

Column 5, line 35: delete "if" and insert -- of --.

Column 5, line 52: between "or" and "expanding" insert -- beam --.

Signed and Sealed this

Eighth Day of April, 1997

*Attest:*

BRUCE LEHMAN

*Attesting Officer*     *Commissioner of Patents and Trademarks*